United States Patent [19]

Westley

[11] Patent Number: 4,581,092
[45] Date of Patent: Apr. 8, 1986

[54] PREFORMED ADHESIVE COMPOSITIONS
[75] Inventor: Stephen A. Westley, Erie, Pa.
[73] Assignee: Lord Corporation, Erie, Pa.
[21] Appl. No.: 617,614
[22] Filed: Jun. 5, 1984
[51] Int. Cl.$^4$ .............................................. C09J 5/10
[52] U.S. Cl. ............................. 156/306.9; 156/331.4; 428/424.8; 428/519; 524/476; 525/123
[58] Field of Search ............................ 156/306.9, 331.4; 428/420, 519, 424.8; 524/476; 525/123

[56] References Cited
U.S. PATENT DOCUMENTS

| | | | |
|---|---|---|---|
| 2,683,103 | 7/1954 | Smook et al. | 428/519 |
| 2,690,780 | 10/1954 | Cousins | 525/123 |
| 3,582,508 | 6/1971 | McIntosh | 525/123 |
| 3,887,756 | 6/1975 | Gerstin et al. | 428/424.8 |
| 4,404,056 | 9/1983 | Kakehi et al. | 156/306.9 |

Primary Examiner—John J. Gallagher

[57] ABSTRACT

Preformed adhesive compositions comprising an elastomeric polymeric material having a residual olefinic unsaturation not greater than 5 mol percent, a polyisocyanate compound and a curing agent are particularly suitable for bonding vulcanized natural and synthetic rubbers. A method for cold-vulcanization bonding of vulcanized rubber goods is disclosed.

3 Claims, 4 Drawing Figures

PREFORMED ADHESIVE COMPOSITIONS

FIELD OF THE INVENTION

This invention relates to adhesive compositions. More particularly, the invention relates to preformed adhesive compositions and their use in bonding vulcanized natural and synthetic rubber goods.

The use of vulcanized natural and synthetic rubber sheeting to provide impermeable barriers for liquid containment, such as in the storage and transportation of water, chemicals and slurries of particulate matter, roof coverings, pond and canal linings, and the like, is well known. For such uses, the rubber sheeting is manufactured in widths from 3 feet to 50 feet and lengths which can exceed 600 feet and transported to the installation site, where the individual strips are joined together.

A particularly critical factor in joining the individual strips of rubber sheeting is the joint or seam durability. Typically, adjacent edges of the strips are overlapped and the resulting seam area is adhesively secured. Vulcanized rubber materials are more difficult to bond, due primarily to the paucity of sites available for crosslinking or imigration of the curative, such as sulfur, peroxide, nitroso compounds or dioxime compounds, from the adhesive to the vulcanized rubber. In addition, the rubber goods and the adhesive joints can be exposed to heat, sun, rain, ponded water, oxidation and ozone which are detrimental to the adhesive bond. There is a demonstrated need for bonding systems which can provide seam or joints whose durability at least approaches that of the vulcanized rubber.

Several bonding systems have been employed in approaches to making the joint more durable with respect to environmental conditions, such as water contact. These include (1) a two-coat system employing a solvent-based adhesive primer in combination with a solvent-based contact adhesive; (2) a one-coat system in which a solvent-based adhesive primer and a solvent-based contact adhesive are first thoroughly blended and the mixture is applied to the seam area; (3) a solvent-based adhesive primer is used in combination with an unvulcanized adhesive tape; and (4) the use of an unvulcanized adhesive tape without any primer, such as that disclosed in Kakahi et al U.S. Pat. No. 4,404,056. The latter system, because it can significantly reduce installation time, is the most desirable, particularly if the tape does not require any significant input of energy, such as applied heat, to initiate and propogate its cure. In addition, preformed adhesive tape substantially reduces flammability and toxic hazards which are associated with solvent-based adhesives and primers.

In accordance with the present invention, there is provided a cold-vulcanizable preformed adhesive composition comprising at least one elastomeric polymeric material, at least one polyisocyanate, at least one vulcanizing agent and tackifying agents. Optionally, and preferably, the preformed adhesive compositions can contain minor amounts of vulcanization promoter compounds, and can also contain filler materials, especially carbon black, as well as other additives customarily employed in the rubber compounding art. The preformed adhesive compositions of this invention exhibit a higher degree of crosslinking to the vulcanized rubbers, especially the low unsaturation butyl, ethylene/-propylene and ethylene/propylene/non-conjugated diene terpolymer rubbers, than do the currently available state-of-the-art preformed adhesive tapes and thus provide significantly improved heat resistance, as well as improved hydrolytic resistance. The invention also provides a method for joining vulcanized natural and synthetic rubber goods comprising placing the preformed adhesive composition between mating surfaces of vulcanized rubber goods and exposing the adhesive joint to ambient conditions of temperature and pressure for a time sufficient for the adhesive composition to cure and complete the joining of the rubber goods.

Figure 1:
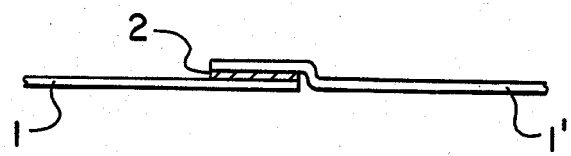
FIG. 1 is a cross-sectional view of overlapped areas of vulcanized rubber goods which are joined in one embodiment of this invention.

More particularly, the novel preformed adhesive compositions of this invention comprise:
(A) 100 parts by weight of at least one elastomeric polymeric material having a residual olefinically-unsaturated content not greater than 5 mol percent;
(B) from 0.5 to 60 parts by weight of at least one elevated temperature tackifying agent;
(C) from 35 to 80 parts by weight of at least one low temperature tackifying agent;
(D) from 0.1 to 25 parts by weight of at least one polyisocyanate; and,
(E) from 1 to 25 parts by weight of at least one curing agent.

The elastomer polymeric materials which must be employed in the practice of the invention are selected from the group consisting of halogenated butyl rubbers and ethylene/propylene/non-conjugated diene rubbers which have a residual olefinic unsaturation not greater than 5 mol percent with such polymeric materials having a residual olefinic unsaturation in the range from 1.5 to 3.5 mol percent being currently preferred. The use of more highly unsaturated elastomers results in premature gelation of the adhesive compositions, rendering them unsuitable for their intended purpose. Currently, the use of halogenated butyl rubbers, especially chlorinated butyl rubbers, is preferred.

Any of the known polyisocyanates having two or more reactive isocyanate groups can be employed in the formulations of the invention. Without limitation, the useful polyisocyanates include aliphatic and aromatic polyisocyanates such as benzene diisocyanate, the toluene diisocyanates (including both the 2,4- and 2,6- isomers and mixtures thereof), hexamethylene diisocyanate, methylene-bis(phenyl isocyanate), methylene-bis(-cyclohexyl isocyanate), isophorone diisocyanate, dimers and trimers of such polyisocyanates, and polymethylene poly(phenyl isocyanate), with methylene-bis(cyclohexyl isocyanate) being currently preferred. The polyisocyanate compunds are present in the preformed adhesive compositions of the invention in the range from 0.1 to 25, preferably 5 to 20, parts by weight per 100 parts by weight of elastomeric polymeric material.

The vulcanizing agents which are employed in the preformed adhesive compositions of the invention are selected from the group consisting of aromatic nitroso compounds and aryl dioxime compound, with the former being currently preferred. The aromatic nitroso compounds are more particularly described poly-C- nitroso aromatic compounds having from 1 to 3 aromatic nuclei, including fused aromatic nuclei, having from 2 to 6 nitroso groups attached directly to non-adjacent nuclear carbon atoms. The presently preferred poly-C-nitroso materials are the dinitroso aromatic compounds, especially the dinitrosobenzenes and dinitrosonaphthalenes, such as the meta- or para-dinitrosobenzenes and the meta- and para-dinitroso-naphthalenes. The nuclear hydrogen atoms of the aromatic nucleus can be replaced by alkyl, alkoxy, cycloalkyl, aryl, aralkyl, alkaryl, arylamine, aryl nitroso, amino, halogen and the like groups. The presence of such substituents on the aromatic nucleus has little effect on the activity of the poly-C-nitroso compounds in the present invention. A partial non-limiting listing of suitable poly-C-nitroso compounds include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenezene, 2-methoxy-1,3-dinitrosobenzene, 5-chloro-1,3-dinitrosobenzene, 2-benzyl-1,4-dinitrosobenzene and 2-cyclohexyl-1,4-benzene.

Aryl dioximes which can be employed in the practice of the invention include, without limitation, p-benzoquinone dioxime, naphthoquinone dioxime, toluiquinone dioxime, diphenoquinone dioxime, diquinoyl dioxime and dibenzoyl dioxime. In the recipes of this invention, the aryl dioximes are used in combination with oxidizing agents, including $Pb_3O_4$, $PbO_2$, $MnO$, and $V_2O_5$.

The poly-C-nitroso vulcanizing agents are typically used in an amount in the range from 0.1 to 30, preferably 1 to 20, parts by weight per 100 parts by weight of elastomeric polymeric material. Amounts outside these ranges can be employed, but the use of higher levels of poly-C-nitroso compound shows no particular benefit. The amount of aryl dioxime-oxidizing agent combination is within the same ranges, with from 2 to 3 parts of oxidizing agent being present per part of aryl dioxime compound.

Substantially any of the known liquid to solid tackifiers which are typically used in rubber compounding can be employed in the practice of the invention. In the general case, the preformed adhesives are intended for use under ambient conditions of temperature and pressure such that the adhesives must not only exhibit tack but also must substantially completely wet the surface of the substrate to which they are applied over a temperature range from 0° F. to 200° F. To meet these requirements, the preformed adhesive compositions of this invention include at least one elevated temperature tackifier and at least one low temperature tackifier, with the latter being paritcularly important. The high temperature tackifiers are typically solid resinous materials having melting points in the range from 135° F. to 280° F. and include petroleum hydrocarbon resins, aliphatic hydrocarbon resins, polyterpene resins, unsaturated hydrocarbon polymer resins and phenol-formaldehyde resins. The high temperature tackifiers are well known articles of commerce, see *Rubber World Blue Book: Materials, Compounding Ingredients, and Machinery for Rubber;* Bill Communications, Inc.; New York, N.Y.; 1981, pages 119 and 174-184. The low temperature tackifiers are low molecular weight materials which are fluid or, if solid, have melting points below 105° F. The low temperature tackifiers are chemically similar to the high temperature tackifiers and, like the high temperature tackifiers, are well known articles of commerce, see *Rubber World Blue Book, supra*. Representative high temperature tackifiers include Piccopale 85 resin (Hercules trademark) and Escorez 5280 (Exxon trademark); representative low temperature tackifiers inclue Piccovar AP-10 (Hercules trademark) and Wingtack-10 (Goodyear trademark). The high temperature tackifier is normally used in a range from 0.5 to 60, preferably 15 to 25, parts by weight per 100 parts by weight of elastomeric polymeric materials. The low temperature tackifier is used in an amount in the range from 40 to 85, preferably 50 to 65, parts by weight per 100 parts by weight of elastomeric polymeric material.

While optional, the preformed adhesive compositions preferably also contain from 0.05 to 3, preferably 0.1 to 1.5 parts by weight per 100 parts by weight of elastomeric polymeric material of at least one vulcanization promoter selected from the group consisting of sulfur, mercaptobenzothiazole, tetramethylthiourea, aryl dioximes and aromatic nitroso ccompounds, when the elastomeric polymeric material is a halogenated butyl rubber.

The preformed adhesives of the invention also preferably contain from 5 to 100, preferably 15 to 40, parts of a reinforcing filler, preferably carbon black, per 100 parts by weight of elastomeric polymeric material.

The preformed adhesives of the invention can also have incorporated therein additives which are conventionally employed by rubber compounders, such as lubricants, softeners, plasticizers, processing aids, retarders and the like.

The adhesive compositions of the invention are prepared by conventional means on conventional rubber compounding equipment, with the polyisocyanate compound and curing agent being charged at the end of the mixing cycle. The mixed compositions are removed from the processing equipment and can be wrapped in release paper for storage, if desired, before being charged to a cold feed extruder where it is processed into continuous strips of finite dimensions, e.g., 3"×0.03"×100'. These strips are interleaved with release paper and rolled up for use on site. Alternatively, the compositions can be extruded directly onto strips of vulcanized rubber sheeting, which can be used to seal seams. The mixing of the compositions is varied somewhat when using halogenated butyl compounds as the elastomeric polymeric material. In this case, a vulcanization promoter, such as p-dinitrosobenzene, is added (0.05 to 3 PHR) is added to the butyl elastomer and, after a short mixing cycle, the remainder of the solid ingredients are dispersed into the elastomer. This composition is transferred to a chilled mill where the low temperature tackifier is blended in, after which the polyisocyanate and curing agent are added. The mixed butyl rubber compositions are otherwise treated as indicated, supra. The extrusion of the rubber compositions into preformed shaped, such as a tape, can be accomplished off-site or on the job site, at the discretion of the contractor, subject to the availability of extrusion equipment.

The preformed adhesive compositions are applied directly to the same areas of the vulcanized rubber material, which has been previously wiped with a volatile, inert organic solvent, such as unleaded gasoline, to remove talc and other lubricants or impurities which may be adhered to the rubber surface. Pressure, on the order of 0.5 to 5 psi, is applied to the seam area, and the seam area is exposed to ambient conditions of temperature and pressure for a time sufficient for the preformed adhesive composition to cure in place. Cure can proceed without application of heat from any external source other than solar; however, if installation temperatures are below 70° F., it is advantageous to apply heat, e.g., electric heaters or steam, to accelerate curing of the adhesive.

Referring now to the drawings, FIG. 1 is a cross-sectional view of overlapped areas of water-impermeable vulcanized rubber sheets 1 and 1 joined according to one embodiment of the invention. In FIG. 1, a cold-vulcanizable preformed adhesive composition of the invention in the form of an adhesive tape 2 having the same width as the overlapped area is disposed between the overlapped area. The overlapped seam area is pressed with a roller or other suitable means for applying pressure in order to increase the self-adhesion between the vulcanized rubber sheets and the preformed adhesive composition and to evacuate any air pockets which may exist in the seam area. The applied pressure is typically from about 0.5 to 5 psi, but can be higher. The tack of the preformed adhesive is such as to provide a green strength in the range from 1 to 7 lbs. In addition, the preformed adhesive composition has a Mooney viscosity in the range from 3 to 30, to ensure proper wetting of the vulcanized rubber seam areas and to permit dirt and other impurities which may remain after the seam area has been wiped with a volatile, inert organic solvent, such as unleaded gasoline, to be pressed into the surface of the adhesive. The tape is thereafter allowed to cold-vulcanize.

Figure 2:
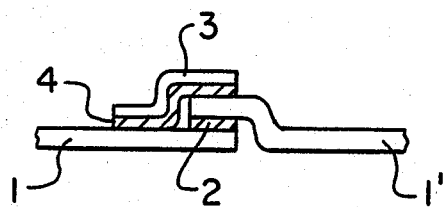
FIGS. 2-4 are cross-sectional views of overlapped areas of vulcanized rubber goods which are joined in other embodiments of the invention.

FIG. 2 is a cross-sectional view of the overlapped areas of water-impermeable vulcanized rubber roofing membranes 1 and 1' that are joined together in a second embodiment of the invention. In this embodiment, a cold-vulcanizable preformed adhesive composition of the invention in the form of an adhesive tape 2 is sandwiched between the overlapped areas of membranes 1 and 1'. The overlapped area is then covered with a preformed adhesive composition tape of this invention comprising a vulcanized rubber layer 3 laminated with the cold-vulcanizable preformed adhesive composition 4 in such a manner that the adhesive composition covers the entire seam area and extends beyond the seam area a distance substantially equal to the seam width. In this embodiment, the entire face of the seam is covered, thus further protecting the seam from environmental factors such as water, and also reinforcing the seam area. The tapes 2 and 4 are thereafter allowed to cold-vulcanize.

Figure 3:
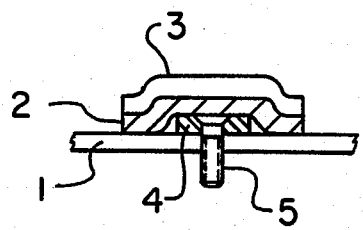

FIG. 3 is a cross-sectional view of yet another embodiment of this invention. In this embodiment, the vulcanized rubber roofing membrane 1 is mechanically achored, such as by bolting means 5, to the underlying roof structure (not shown), through a steel strip or batten 4 which is predrilled, through holes (not shown) which are punched or drilled in the membrane 1. The anchor assembly coprises a vulcanized rubber layer 3 having laminated thereto cold-vulcanizable preformed adhesive composition 2. After rolling, the adhesive composition 2 is cold-vulcanized.

Figure 4:
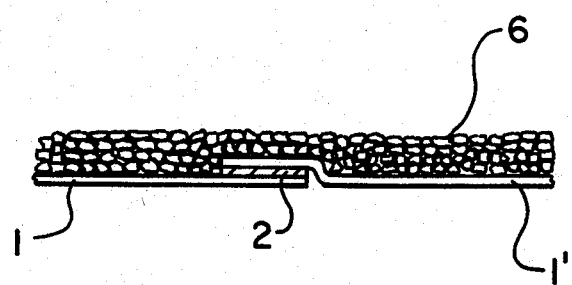

FIG. 4 is a cross-sectional view of another means of anchoring vulcanized rubber membranes. The embodiment of FIG. 4 is identical to that of FIG. 1, except that the roofing membrane is held in place by loose particulate matter 6, such as river gravel.

The invention is illustrated by the following examples.

EXAMPLE I

The following ingredients were blended by conventional techniques in conventional rubber compounding mixing equipment (Banbury mixer and chilled rubber mill) and charged to a conventional mixing extruder from which a cold-vulcanizable preformed adhesive tape having a width of 1" and a thickness of 0.03" was extruded.

|  | PARTS BY WEIGHT |
| --- | --- |
| Chlorinated butyl rubber | 100 |
| Carbon black | 25 |
| Paraffinic processing oil | 10 |
| Polybutene softener | 10 |
| High temperature tackifier | 22.5 |
| (Escorez, Exxon Co. U.S.A., mp 185° F.) |  |
| Methylene-bis(cyclohexyl isocyanate) | 10 |
| Vulcanization promoter, p-dinitrosobenzene | 0.5 |
| Low temperature tackifier (Wingtack resin, Goodyear Tire & Rubber Co.; mp 50° F.) | 60 |
| Curing agent, p-dinitrosobenzene | 10 |

Samples are prepared, using the thus-prepared preformed adhesive tape peel strength (ASTM 413, Method A, 180°) as follows: Peel strength specimens are prepared by placing the adhesive between 1"×6" strips of the vulcanized ethylene-propylenedicyclopentadiene terpolymer rubber, with the adhesive covering 4 inches, measured from one end of the strips. The joint area is pressed together with a pressure of 10 psi.

The test specimens are placed in a heated oven and exposed to a cure cycle of 158° F. for 10 days. Following the cure cycle, the samples are cooled and the samples are stored at room temperature to evaluate the time-dependent change in peel strength. The results are shown in the following Table:

| AGE | PEEL STRENGTH, LB/IN |
| --- | --- |
| Immediately after cure | 5.4 |
| 24 hours | 8.4 |
| 7 days | 10.8 |
| 14 days | 11.2 |
| 28 days | 12.0 |
| 90 days | 13.0 |

EXAMPLE II

Samples of the preformed adhesive composition of Example I and a Mitsuboshi Belting Co., Ltd., adhesive tape composition, believed to be prepared accordng to Kakehi et al U.S. Pat. No. 4,404,056 were evaluated by Differential Scaning Colorimetry (DSC). No change is seen with the Mitsuboshi compositions as the temperature is incrementally raised from room temperature to over 250° C.; whereas the Example I compositions provide evidence of a chemical change occurring at temperatures above 100° C.

EXAMPLE III

A preformed adhesive tape is prepared from the following ingredients.

|  | PARTS BY WEIGHT |
| --- | --- |
| Chlorinated butyl rubber | 100 |
| Carbon black | 25 |

-continued

| | PARTS BY WEIGHT |
|---|---|
| Process oil | 20 |
| High temperature tackifier (Escorez, Exxon Co. U.S.A., mp 185° F.) | 22.5 |
| Methylene-bis(cyclohexyl isocyanate) | 10 |
| p-Dinitrosobenzene | 10 |
| Low temperature tackifier (Wingtack-10, Goodyear Tire & Rubber Co.; mp 34° F.) | 60 |

Mixed composition is extruded in the form of a preformed adhesive tape 1"×0.03"×3'. For the lap shear tests, the adhesive tape is placed between 1"×6" strips of vulcanized ethylene-propylene-dicyclopentadiene terpolymer rubber, overlapped to provide a seam area of 1 sq. in. Identical assemblies are made using a commercially available tape from Mitsuboshi Belting Ltd., believed to be made according to Kakehi et al U.S. Pat. No. 4,404,056. In all cases, the vulcanized terpolymer rubber was wiped with hexane solvent. Peel strength test specimens are prepared from both tapes following the procedure of Example I.

The adhesively-joined assemblies are placed in a heated oven and exposed to a cure cycle of 158° F. for 10 days. Following the cure cycle, the assemblies are divided into three batches. From the first batch, the cured assemblies are immersed in water held at a temperature of 32° F. and tested in shear and peel following the procedure of ASTM D1002-78 and ASTM 413 (Method A, 180°), respectively after 14, 30, 60, and 90 days of exposure. The bonded assemblies of the second batch are immersed in water maintained at a temperature of 158° F. and tested in a manner identical to the first batch. The bonded assemblies of the third batch are tested at room temperature with no water immersion following the procedure of ASTM.

rubber goods a preformed adhesive composition comprising
(A) 100 parts by weight of chlorinated butyl rubber having a residual olefinically-unsaturated content not greater than 5 mol percent;
(B) from 0.5 to 60 parts by weight of at least one elevated temperature tackifying agent;
(C) from 35 to 80 parts by weight of at least one low temperature tackifying agent;
(D) from 0.1 to 25 parts by weight of at least one polyisocyanate; and
(E) from 0.1 to 30 parts by weight of at least one curing agent selected from the group consisting of aromatic nitroso compounds and aryl dioxime compounds, said aryl dioxime compounds being use in combination with from 2 to 3 parts by weight of at least one oxidizing agent; applying pressure to said overlapped areas to provide an initial adhesive strength of at least one lb/in., and exposing said adhesively joined areas to ambient conditions of heat and pressure for a time sufficient to vulcanize said adhesive.

2. A preformed adhesive composition comprising
(A) 100 parts by weight of chlorinated butyl rubber having a residual olefinically-unsaturated content not greater than 5 mol percent;
(B) from 0.5 to 60 parts by weight of at least one elevated temperature tackifying agent;
(C) from 35 to 80 parts by weight of at least one low temperature tackifying agent;
(D) from 0.1 to 25 parts by weight of at least one polyisocyanate; and
(E) from 0.1 to 30 parts by weight of at least one curing agent selected from the group consisting of aromatic nitroso compounds and aryl dioxime compounds, said aryl dioxime compounds being used in combination with from 2 to 3 parts by

| ENVIRONMENTAL | EXAMPLE PEEL, LB/IN | ADHESIVE TAPE SHEAR PSI | MITSUBOSHI ADHESIVE TAPE PEEL LB/IN | SHEAR PSI |
|---|---|---|---|---|
| Room temperature no water immersion | 12.5 COH[a] | 66.2; 80 COH; 20 RC[b] | 10.3; 21 COH; 79 RC | 30 COH |
| Water immersion 32° F. | | | | |
| 14 days | 14.1; COH[a] | 70.2; 90 COH; 10 RC[b] | 13.4; 50 COH; 50 RC | 30.5; RC |
| 30 days | 12.9; COH[a] | 64; 83 COH; 17 RC | 11.4; 72 COH; 28 RC | 24; RC |
| 60 days | 13.4; 97 COH; 3 RC | 67; 91 COH; 9 RC | 12.3; 82 COH; 18 RC | 32.2; RC |
| 90 days | 14.8; COH | 73.8; COH | 10.6 RC | 35.9; RC |
| 158° F. | | | | |
| 14 days | 16.2; 90 COH; 10 RC | 73; RC | 7.7; RC | 39.2; RC |
| 30 days | 20.2; 61 COH; 39 RC | 76.7; RC | 7.9; RC | 38.2; RC |
| 60 days | 18.3; 10 COH; 90 RC | 71.5; RC | 8.3; RC | 41.2; RC |
| 90 days | 23.3; RC | 69.5; RC | 9.1; RC | 36; RC |

What is claimed is:

1. A method for bonding vulcanized rubber goods comprising placing between overlapped areas of said weight of at least one oxidizing agent.

3. A preformed adhesive composition according to claim 1 containing from 0.05 to 3 parts by weight of at least one vulcanization promoter.

* * * * *